(12) United States Patent
Goel et al.

(10) Patent No.: US 12,425,363 B2
(45) Date of Patent: Sep. 23, 2025

(54) CONTENT MANAGEMENT SYSTEM WITH INTEGRATED EMAIL SERVICE

(71) Applicant: Dropbox, Inc., San Francisco, CA (US)

(72) Inventors: Samir Goel, San Francisco, CA (US); Abhishek Agrawal, San Francisco, CA (US); Devdatta Akhawe, Berkeley, CA (US); Renuka Apte, San Francisco, CA (US); Nikhil Bhargava, San Francisco, CA (US); Pranav Piyush, Burlingame, CA (US); Samir Naik, San Francisco, CA (US); Nicholas Sundin, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/824,551

(22) Filed: May 25, 2022

(65) Prior Publication Data

US 2022/0286417 A1    Sep. 8, 2022

Related U.S. Application Data

(63) Continuation of application No. 15/474,770, filed on Mar. 30, 2017, now Pat. No. 11,356,396.
(Continued)

(51) Int. Cl.
*H04L 51/08* (2022.01)
*G06Q 10/107* (2023.01)
(Continued)

(52) U.S. Cl.
CPC ........... *H04L 51/08* (2013.01); *G06Q 10/107* (2013.01); *H04L 51/216* (2022.05); *H04L 51/48* (2022.05); *H04L 67/02* (2013.01); *H04L 67/306* (2013.01)

(58) Field of Classification Search
CPC .... H04L 51/234; H04L 51/42; H04L 67/1095
See application file for complete search history.

(56) References Cited

U.S. PATENT DOCUMENTS

| 9,503,280 | B2 | 11/2016 | Jhingan et al. |
| 2002/0143691 | A1* | 10/2002 | Ramaley ............... G06Q 10/10 |
| | | | 705/37 |

(Continued)

OTHER PUBLICATIONS

Advisory Action from U.S. Appl. No. 15/474,770, mailed Dec. 22, 2020, 3 pages.

(Continued)

*Primary Examiner* — William G Trost, IV
*Assistant Examiner* — Christopher P Cadorna
(74) *Attorney, Agent, or Firm* — Polsinelli PC

(57) ABSTRACT

Disclosed herein are techniques for combining content management system functionality with an email or messaging server. A system can associate an email with a content item, through express attachment, direct reference such as a link, indirect reference, or otherwise. The system can store the associated content item within content item storage or identify a stored content item that is identical to the content item that is associated with the email. The system can then enhance email service functionality with the stored content item. For example, the system can present the stored content item or information about the stored content item along with the email. The system can also automatically grant permissions to the stored content item with participants of the email.

17 Claims, 13 Drawing Sheets

Related U.S. Application Data

(60) Provisional application No. 62/440,679, filed on Dec. 30, 2016.

(51) Int. Cl.
  *H04L 51/216* (2022.01)
  *H04L 51/48* (2022.01)
  *H04L 67/02* (2022.01)
  *H04L 67/306* (2022.01)

(56) References Cited

U.S. PATENT DOCUMENTS

| | | | |
|---|---|---|---|
| 2009/0030997 A1* | 1/2009 | Malik | H04L 51/08 709/206 |
| 2010/0011077 A1 | 1/2010 | Shkolnikov et al. | |
| 2011/0029625 A1 | 2/2011 | Cheng et al. | |
| 2012/0185545 A1 | 7/2012 | Ianni et al. | |
| 2013/0031136 A1* | 1/2013 | Shah | G06F 21/6218 707/783 |
| 2013/0238720 A1 | 9/2013 | Tulasidas et al. | |
| 2014/0189808 A1 | 7/2014 | Mahaffey et al. | |
| 2015/0095430 A1 | 4/2015 | Kaushik et al. | |
| 2015/0264111 A1 | 9/2015 | Aleksandrov et al. | |
| 2015/0350133 A1 | 12/2015 | Murphy et al. | |
| 2016/0050177 A1* | 2/2016 | Cue | H04L 51/234 709/206 |
| 2016/0179838 A1 | 6/2016 | Mavinakuli et al. | |
| 2016/0246815 A1 | 8/2016 | Vibhor et al. | |
| 2016/0269337 A1 | 9/2016 | Blinder et al. | |
| 2016/0283085 A1* | 9/2016 | Beausoleil | H04L 51/52 |
| 2016/0294758 A1 | 10/2016 | Farhat | |
| 2016/0308940 A1 | 10/2016 | Procopio et al. | |
| 2017/0019360 A1 | 1/2017 | Crevier et al. | |
| 2017/0139914 A1 | 5/2017 | Newman et al. | |
| 2017/0140048 A1 | 5/2017 | Wang et al. | |
| 2017/0180285 A1* | 6/2017 | Contractor | H04L 51/08 |
| 2017/0187656 A1* | 6/2017 | Bastide | H04L 67/141 |
| 2017/0208025 A1 | 7/2017 | Chakra et al. | |
| 2017/0214641 A1 | 7/2017 | Mishra | |
| 2018/0089183 A1* | 3/2018 | Schwartz | G06F 16/2255 |

OTHER PUBLICATIONS

Advisory Action from U.S. Appl. No. 15/474,770, mailed Nov. 16, 2021, 3 pages.
Final Office Action from U.S. Appl. No. 15/474,770, mailed Aug. 9, 2021, 20 pages.
Final Office Action from U.S. Appl. No. 15/474,770, mailed Mar. 12, 2020, 16 pages.
Final Office Action from U.S. Appl. No. 15/474,770, mailed Oct. 23, 2020, 20 pages.
Non-Final Office Action from U.S. Appl. No. 15/474,770, mailed Dec. 15, 2021, 23 pages.
Non-Final Office Action from U.S. Appl. No. 15/474,770, mailed Feb. 19, 2021, 19 pages.
Non-Final Office Action from U.S. Appl. No. 15/474,770, mailed Jun. 12, 2020, 19 pages.
Notice of Allowance from U.S. Appl. No. 15/474,770, mailed Mar. 31, 2022, 8 pages.

* cited by examiner

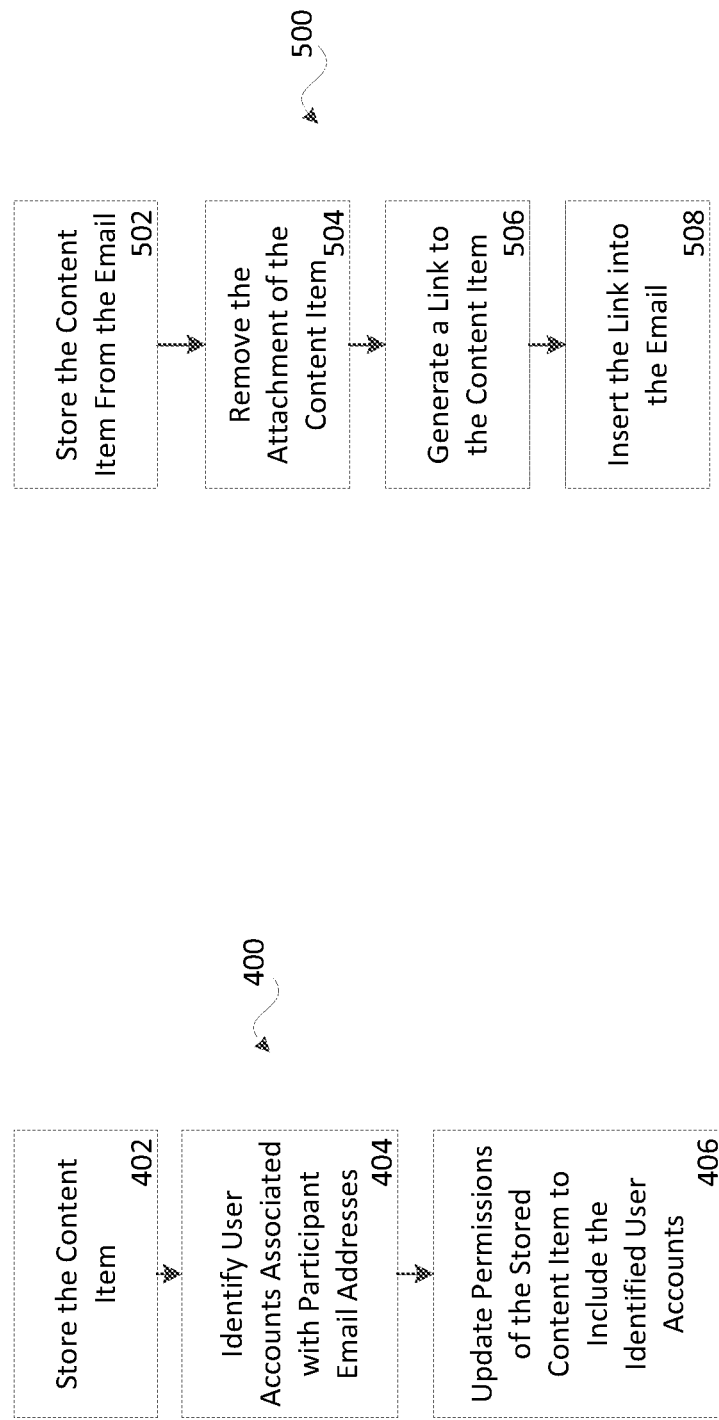

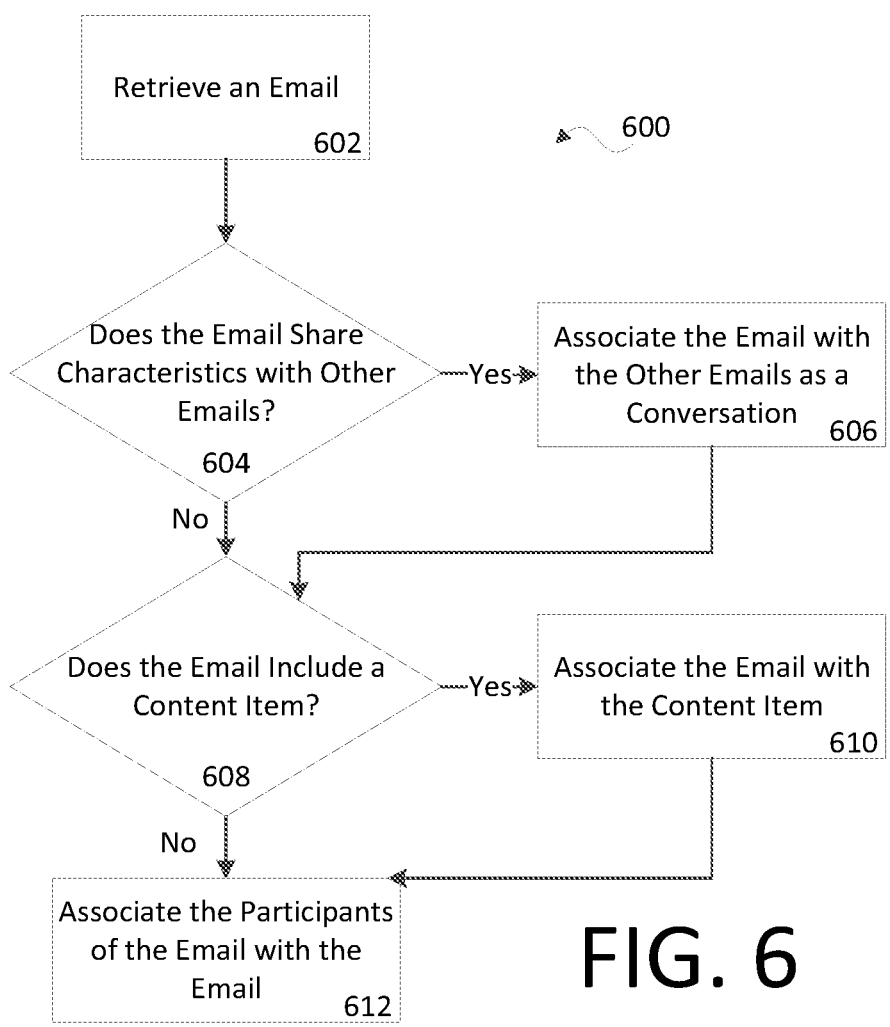

CONTENT MANAGEMENT SYSTEM WITH INTEGRATED EMAIL SERVICE

CROSS REFERENCE TO RELATED APPLICATIONS

This application is a continuation and claims the benefits of U.S. application Ser. No. 15/474,770, filed on Mar. 30, 2017, entitled, CONTENT MANAGEMENT SYSTEM WITH INTEGRATED EMAIL SERVICE, which claims priority under U.S.C. § 119(e) to U.S. provisional application No. 62/440,679, filed on Dec. 30, 2016, entitled, CONTENT MANAGEMENT SYSTEM WITH INTEGRATED EMAIL SERVICE, all of which are hereby expressly incorporated herein by reference in its entirety and for all purposes.

BACKGROUND

Systems have largely managed and presented email using now antiquated methodologies. Most email services lack meaningful integration with other datacenter resources and merely function to route email messages. Although email has grown in adoption to be a near universal mode of communication, it has failed to develop much additional functionality.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and should not limit the scope of the present technology to these examples. Furthermore, the skilled artisan will appreciate the principles of the present technology as described and explained with additional specificity and detail through the use of the accompanying drawings in which:

FIG. 4 Shows an example method for storing a content item and updating permissions of the stored content item;

FIG. 5 shows an example method for storing a content item from an email, removing the attachment of the content item and inserting a link to the stored content item into the email;

FIG. 6 shows an example method for associating content items, emails, and participants;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to augment and integrate email functionality with content management capabilities. Because email has traditionally followed paradigms developed based on physical mail limitations, email services have taken a limited role in interacting with email. This limited role preserves email messages in the state in which they were originally sent, and treats email functionality as a separate unit of operation from other operations on a datacenter, such as content management. As a result, participants of an email conversation often will send content items as email attachments, which creates duplicate copies of the content item, breaks version control of the content item, circumvents data leak protection systems, and nullifies many other features of a content management system. For some users, email also becomes a way to keep track of a file, and revisions, as well as a means to transfer content items between client devices and email users while many of these uses are better handled by a content management system.

Past attempts at integration of a content management system and an email service have mostly been artificial. Such attempts merely allowed attachments or links from a content management system to be added to emails, but they did not provide any other content management system benefits directly into email. Further, such attempts at integration are often limited to APIs from a client application.

This disclosure describes ways to improve the functionality of an email service by fully integrating it with a content management system. The present disclosure describes an approach that adds an email service into a content management system. When integrated in this way an email service can manage attachments directly within a content management system and provide participants of the email access to the stored copies of the attachments. Since the content management system manages the attachments and the email service, it can provide additional benefits as will be described in detail herein.

Figure 1:
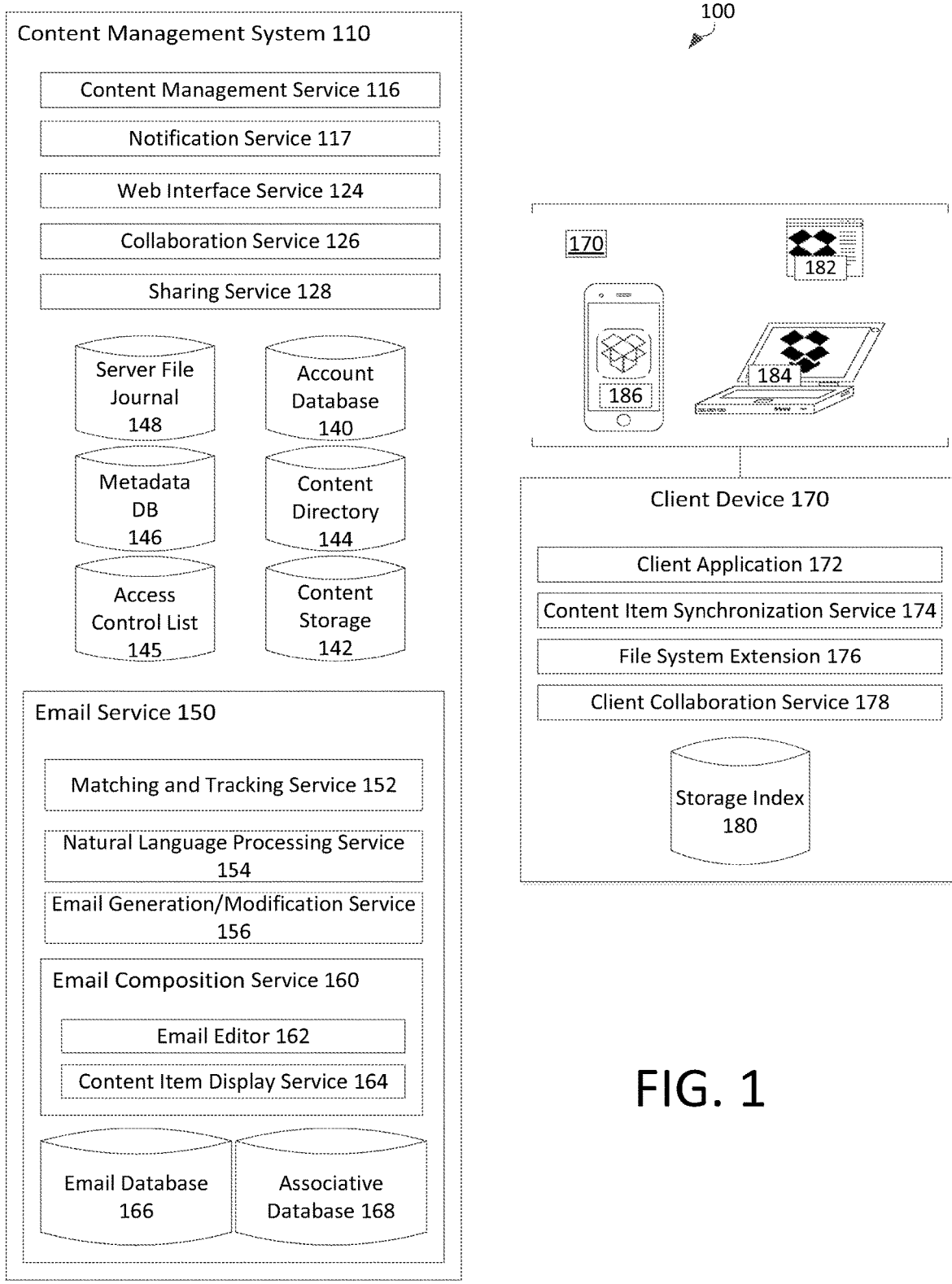
FIG. 1 shows an example of a content management system and client devices.

In some embodiments the disclosed technology is deployed in the context of a content management system having content item synchronization capabilities and collaboration features, among others. FIG. 1A shows an example of a system configuration 100, which includes content management system 110 interacting with client device 170.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for a registered entity can include a username and/or email address. Account database 140 can include account management information, such as account type (e.g., various tiers of free or paid accounts), storage space allocated, storage space used, client devices 170 having a registered content management client application 172 resident thereon, security settings, personal configuration settings, etc.

Account database 140 can store groups of accounts associated with an entity. Groups can have permissions based on group policies and/or access control lists, and members of a group can inherit the permissions. For example, a marketing group can have access to one set of content items while an engineering group can have access to another set of content items. An administrative group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1A.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can usually ensure that content item duplicates are recognized as such since the deterministic hash function will generally output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 170 depending on the file system used by client device 170.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control system that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 170. Client device(s) can take different forms and have different capabilities. For example, client device 184 is a computing device having a local file system accessible by multiple applications executing on the device. Client device 186 is a computing device in which content items may only be accessible to a specific application or by permission given by the specific application, and the content items can be stored in an application specific space and/or in a remote network. Client device 182 is any client device accessing content management system 110 via a web browser and accessing content items via a web interface. While example client devices 184, 186, and 182 are depicted in form factors such as a laptop, mobile device, or web browser, it should be understood that these descriptions do not limit client devices to these form factors. For example, a mobile device, such as client device 186, may have a local file system accessible by multiple applications executing on the device, or client device 186 may access content management system 110 via a web browser. As such, the form factor should not be considered limiting when considering client device 170's capabilities. One or more functions described in this disclosure with respect to client device 170 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 172 stored and running on client device 170. Client application 172 can include a content item synchronization service 174.

Content item synchronization service 174 can be in communication with content management service 116 to synchronize changes to content items between client device 170 and content management system 110.

Client device 170 can synchronize content with content management system 110 via content synchronization service 174. The synchronization can be platform agnostic. That is, content can be synchronized across multiple client devices of varying types, capabilities, operating systems, etc. Content synchronization service 174 can synchronize any changes (new, deleted, modified, copied, or moved content items) to content items in a designated location of a file system of client device 170.

Content items can be synchronized from client device 170 to content management system 110, and vice versa. In embodiments in which client device 170 initiates synchronization of content items with content management system 110, a user can manipulate content items directly from the file system of client device 170, while file system extension 174 (which can be integrated with the local file system, or even the operating system kernel) can intercept read, write, copy, move, delete commands relative to content items in the designated location of the file system of client device 170. When file system extension 174 detects a write, move, copy, or delete command, it can notify content item synchronization service 174, which can synchronize the changes to content management system service 116. In some embodiments, content item synchronization service 174 can perform some functions of content management system service 116 including functions addressed above such as dividing a content item into blocks, hashing the content item to generate a unique identifier, etc. Content synchronization service 174 can index content within client storage index 180 and save the result in storage index 180. Indexing can include creating a unique identifier for each content item. In some embodiments, content synchronization service 174 creates this unique identifier by putting the data of the content item (e.g., excluding the filename and/or other metadata) through a hash function; as addressed above, content management system can use a similar process to provide identifiers to content on content management system 110. Content synchronization service 174 can use storage index 180 to facilitate the synchronization of at least a portion of the content within client storage with content associated with a user account on content management system 110. For example, content synchronization service 174 can compare storage index 180 with content management system 110 and detect differences between content on client storage and content associated with a user account on content management system 110. Content synchronization service 174 can then attempt to reconcile differences by uploading, downloading, modifying, and/or deleting content on client storage as appropriate. Content management service 116 can store the changed or new block for the content item and update server file journal 148, metadata database 146, content directory 144, content storage 142, account database 140, etc., as appropriate.

When synchronizing content from content management system 110 to client device 170, a modification, addition, deletion, and/or move of a content item recorded in server file journal 148 can trigger delivery of a notification to client device 170 using notification service 117. When client device 170 receives the notification of the change to server file journal 148, client device 170 can check storage index 180 to determine if the time stamp of the change occurred since the last synchronization, or determine if the specific change has been synchronized. When client device 170 determines that it is out of synchronization with content management system 110, content item synchronization service 174 can request content item blocks including the changes, and client device 170 can update its local copy of the changed content items. In some embodiments, notification service 117 can query other services or databases of content management system 110, such as server file journal 148, to gain more context for the notification, to determine if a notification can be batched with another notification, or to supplement a notification, etc.

Sometimes client device 170 may not have a network connection available. In this scenario, content item synchronization service 174 can monitor the linked collection for content item changes and queue those changes for later synchronization to content management system 110 when a network connection is available. Similarly, a user can manually start, stop, pause, or resume synchronization with content management system 110.

Content item synchronization service 174 can synchronize all content associated with a particular user account on content management system 110. Alternatively, content item synchronization service 174 can selectively synchronize a portion of the content of the total content associated with the particular user account on content management system 110. Selectively synchronizing only a portion of the content can preserve space on client device 170 and improve performance of client device 170 and content management system 110 by reducing the processing, memory, storage, and network resources that would otherwise be consumed by synchronizing all content.

In some embodiments, content item synchronization service 174 selectively stores a portion of the content associated with the particular user account and stores placeholder content items in client storage for the remainder portion of the content. For example, content item synchronization service 174 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 170 attempts to access the content item, content item synchronization service 174 can retrieve the data of the content item from content management system 110 and provide the complete content item to accessing client device 170. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible via web interface service 124 or the directory structure associated with the additional user's account on client device 170. The sharing can be performed in a platform agnostic manner. That is, the content can be shared across multiple client devices 170 of varying types, capabilities, operating systems, etc. The content can also be shared across varying types of user accounts.

To share a content item within content management system 110, sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, e.g., from within a corporate network domain, or by accounts associated with a specified domain, e.g., accounts associated with a company account (e.g., @acme.com).

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request for an upload location from sharing service 128a, provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 178 can request notifications service 117 to send notifications to other client devices having access to the shared content item when any one client device accesses the shared content item. Notifications service 117 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 117 to other user accounts to determine which user accounts have (or have not) interacted with the shared content item.

In some embodiments, collaboration service 126 can facilitate commenting for content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Collaboration on Content Items

Collaboration service 126 can also provide an interactive content item collaboration platform in which users can simultaneously make changes to shared content items, provide comments regarding the shared content items, manage tasks associated with the shared content items, etc. These shared content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements can be stored in a database to allow for search and retrieval of the shared content items. Multiple user accounts may access, view, edit, and otherwise collaborate on shared content items at the same time or at different times. In some embodiments, this can be managed through a web interface that enables two users to work on the same copy of a shared content item at the same time.

Collaboration Client Interface

In some embodiments, client collaboration service 178 can provide a native application interface for displaying information relevant to a content item being presented on client device 170. In some embodiments, certain content items associated with a native application may not be capable of presenting the collaboration data addressed above. In such embodiments, client collaboration service 178 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 170, can programmatically make API calls directly to content management system 110 when a user account provides authentication credentials, to read, write, create, delete, share, or otherwise manipulate content.

A user can utilize a user account to view or manipulate content via a web interface generated and served by web interface service 124. For example, the user can navigate in a web browser to a web address associated with the user account provided by content management system 110. Changes or updates to content in content storage 178 made through web interface 124, such as uploading a new version of a content item, can be propagated back to other client devices associated with the user account. For example, multiple client devices, each with their own client software, can be associated with a single account and content items in the account can be synchronized between each of the multiple client devices.

Client device 170 can connect to content management system 110 on behalf of a user account. A user of the user account can directly interact with client device 170, for example when client device 170 is a desktop or laptop computer, phone, television, internet-of-things device, etc. Alternatively or additionally, client device 170 can act on behalf of the user account without the user having physical access to client device 170, for example when client device 170 is a server.

Some features of client device 170 are enabled by an application installed on client device 170. In some embodiments, the application can include a content management system specific component. For example, the content management system specific component can be a stand-alone application 172, one or more application plug-ins, and/or a browser extension. However, the user can also interact with content management system 110 via a third-party application, such as a web browser, word processor, spreadsheet program, presentation program, source code control tool, etc. that resides on client device 170 and capable of communicating with content management system 110. In various implementations, client-side application 172 can present a user interface (UI) for a user to interact with content management system 110. For example, the user can interact with the content management system 110 via file system extension 176 integrated with the file system or via a webpage displayed using a web browser application.

In some embodiments, client application 172 can manage and synchronize content for more than one account of content management system 110. In such embodiments, client application 172 can remain logged into multiple accounts and provide normal services for the multiple accounts. In some embodiments, each account can appear as folder in a file system, and all content items within that folder can be synchronized with content management system 110. In some embodiments, client application 172 can include a selector to choose one of the multiple accounts to be the primary account or default account.

Email Service

Email service 150 can be integrated within content management system 110. In some embodiments, client device 170 performs some of the functionality of email service 150. Email service 150 can provide many services and communicate with services of content management system 110. For example, content management system 110 can present information received from email service 150 such as emails and attachments alongside content items. Email service 150 can present information received from content management system 110 alongside or within emails.

Email service 150 can include content item/email/participant matching and tracking service 152 (hereafter, "matching and tracking service 152") to establish and maintain relationships between content items, emails, and participants of emails. Matching and tracking service 152 can analyze emails in email database 166 and store relationships in associative database 168. Associative database 168 can contain a graph of relationships where nodes (e.g., content items, emails, participants, etc.) have relationships with other nodes. The relationships can merely indicate an association (e.g., a participant is associated a content item) or can qualify the relationship (e.g., the participant has particular permissions with the content item). Matching and traffic service 152 can determine associations derived from other associations. For example, a user account can be associated with an email address which can be associated with an email which can be associated with a conversation which can be associated with a second email which can be associated with a content item. Each entity, the user account, and the content item can be entities in a database, or graph, and can be linked to record the relationship.

Matching and tracking service 152 can associate an email address of an email with a user account in account database 140. For example, if an email has "john@example.com" as a participant, then matching and tracking service 152 can determine if "john@example.com" is registered with an account on account database 140. If the email address is registered with an account, matching and tracking service 152 can associate the email address with the account or an account identifier and store the relationship in associative database 168.

Matching and tracking service 152 can associate a participant (e.g., email address and/or user account) with all email messages that include the participant. For example, matching and tracking service 152 can associate the participant with certain emails as a "sender", "recipient", and/or "referenced participant." A referenced participant can be a participant that is referenced by the email, but is not a direct participant such as a sender or recipient. An email can reference a participant by "@Name" tags, referencing a content item that is shared with or owned by the referenced participant, etc.

Matching and tracking service 152 can associate a participant with a content item. For example, matching and tracking service 152 can communicate with metadata database 146, access control list 145, sharing service 128, etc. to identify content items associated with a participant of an email. For example, matching and tracking service 152 can determine that the participant owns, has access to, and/or has modified the content item attached to the email. Another example includes the content item being shared with the participant or the participant otherwise receiving access to the content item. In some embodiments, matching and tracking service 152 associates a content item with a participant because the content item is located on a client device 170 associated with the user account. Associative database 168 record the associations between participants and content items.

Matching and tracking service 152 can detect email conversations (also termed "threads" or "chains") and store an entry for the conversation in associative database 168 which points to each message of the conversation. Matching and tracking service 152 can detect email conversations based on the emails having an identical subject line, a similar subject line, the same participants, a shared conversation identifier, etc.

Matching and tracking service 152 can associate content items with emails. For example, a content item can be an attachment to an email, directly referenced (via a URL) by the email, and/or indirectly referenced (e.g., a natural language reference) by the email.

Matching and tracking service 152 can match a content item in an email (e.g., an attachment or a reference) in email database 166 to a content item stored in content storage 142. Matching and tracking service 152 can do this by comparing the two content items and determining that they have the same data; this can be done by hashing at least a portion of the content items.

In some embodiments, matching and tracking service 152 can receive an instruction to associate two entities (e.g., a content item, an email, and participants) in the database or graph. This might occur if, for example, an email does not include a content item and a user manually instructs email service 150 to associate the email with the content item.

Natural language processing service 154 can analyze content items in content storage 142 to determine the subject matter of the content items and what keywords can be associated with the content items. Natural language processing service 154 can analyze emails in email database 166. For example, natural language processing service 154 can detect subject matter and keywords of emails. In some embodiments, natural language processing service 154 can determine that an email of email database 166 indirectly references a content item of content storage 142. Natural language processing service 154 can then communicate with matching and tracking service 152 to associate the email and the content item in associative database 168. In some embodiments, machine learning can help with this matching. For example, a machine learning service on content management system 110 can identify patterns and keywords of content items in content storage 142 and matching and tracking service 152 can match to keywords for an email as identified by natural language processing service 154.

In some embodiments, natural language processing service 154 can generate natural language descriptions of content items, emails, relationships (e.g., within associative database 168), modifications made to content items, etc.

Email generation and modification service 156 can draft emails and modify emails programmatically. Email generation and modification service 156 can use natural language processing service 154 to automatically generate an email with natural language and send the email to participants of a conversation. For example, content management service 116 can detect a modification in a content item and notify email service 150 which can have matching and tracking service 152 use associative database 168 to identify an email conversation associated with the content item and the participants of that conversation. Email generation and modification service 156 can then instruct natural language processing service 154 to summarize the modifications of the content item which can be included in an email sent to the participants, thereby updating them of the status of the content item.

In some embodiments, email generation and modification service 156 receives an email and modifies the email. For example, it can take an email with an attachment, remove the attachment, save the attachment in content storage 142, and include a link to the content item of content storage 142 within the email. Email generation and modification service 156 can work with emails in email database 166. In some embodiments, email generation and modification service 156 extracts content items attached to emails from email database 166 and stores them in content storage 142. Whenever an email is requested, email generation and modification service 156 can determine that the email had an attached content item that is now stored in content storage 142; and retrieved the content item from content storage 142. In some embodiments, sharing service 128 instructs email editor 162 to draft a sharing email indicating that a content item is shared with the participants.

Email composition service 160 can work with email generation and modification service 156 to provide a user interface for composing emails. In some embodiments, email composition service 160 can be used to view emails, even if it lacks email drafting functionality. In some embodiments, client device 170 runs at least a portion of email composition service 160. In some embodiments, at least a portion of email composition service 160 (e.g., email editor 162 and/or content item display service 164) is provided through a web site. For example, web interface service 124 can provide features of email composition service 160. Email editor 162 can provide an interface for a user to draft emails. In some embodiments, email editor 162 can communicate with account database 140 to suggest accounts of content management system 110/email addresses to be recipients of an email. In some embodiments, email editor 162 verifies a sender using account database 140.

Content item display service 164 can display a content item from content storage. This can include a representation of the content item (e.g., an icon or a description of the content item), a preview image, metadata associated with the content item, etc. In some embodiments, content item display service 164 presents a sidebar that is placed alongside email editor 162. Content item display service 164 can be integrated within email editor 162. Content item display service 164 can be an overlay for email editor 162. In some embodiments, content item display service 164 is a separate program or application than email editor 162.

Content item display service 164 can use matching and tracking service 152 to identify a content item or content items associated with an email within email editor 162. Content item display service 164 can then present the content item or a representation of the content item alongside or within email editor 162. In some embodiments, content item display service 164 can present metadata associated with the content item. For example, it can communicate with collaboration service 126 and access control list 145 to determine other user accounts that have access to the content item, other user accounts that have viewed the content item, etc.

Content item display service 164 can indicate which users have viewed a content item, have access to the content item, are currently accessing the content item, etc. For example, in some embodiments, when a user account receives an email, email service 150 can display the received email. In some embodiments, email service 150 can communicate with collaboration service 126 that the user account has received, viewed, or flagged the email. If the email includes a content item, this information can be associated with the content item and presented by content item display service 164.

While this disclosure presents system 100 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

Figure 2:
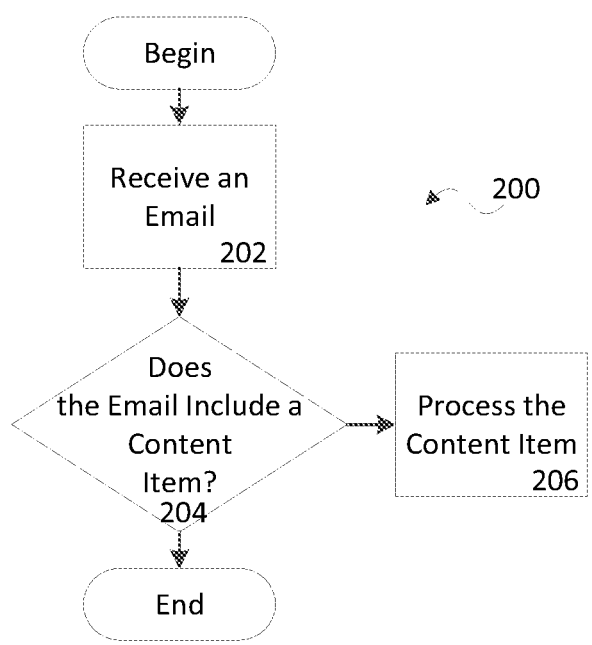
FIG. 2 shows an example method for receiving an email and processing an associated content item.

FIG. 2 shows an example method 200 for receiving an email and processing an associated content item. Email service 150 of content management system 110 can receive an email (202). For example, email service 150 can receive the email as a draft from email editor 162, a draft saved in email database 166, a received email addressed to a user account of email service 150, an email sent from client device 170, etc.

Email service 150 can determine if the email includes a content item (204). The email can include the content item by attachment, direct reference, or indirect reference as described in further detail in FIG. 3. For example, in some If the email includes a content item, then email service 150 can process the content item (206). For example, email service 150 can save the content item in association with a user account, and associate the respective email with a similar content item stored at content storage 142.

Figure 3:
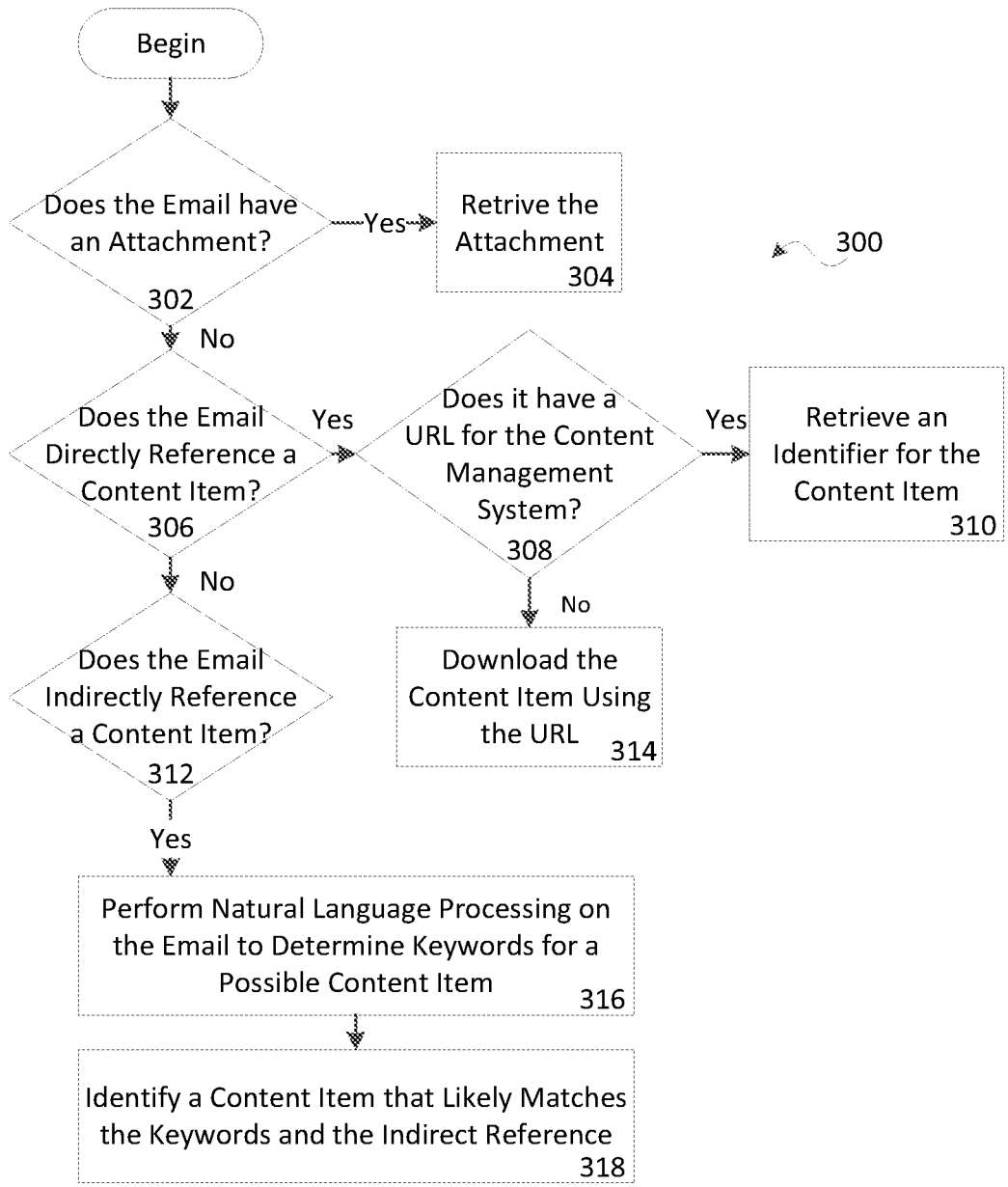
FIG. 3 shows an example method for determining if an email includes a content item and retrieving or identifying the content item.

FIG. 3 shows an example method 300 for determining if an email includes a content item and retrieving or identifying the content item. Step 204 of FIG. 2 can include some or all of example method 300.

Email service 150 can determine if the email has an attachment (302). If the email has an attachment, email service 150 can retrieve the attachment (304). In some embodiments, this can include extracting the attachment from the email. In some embodiments, the attachment is a content item that is a container of content items (e.g., a ".zip" file or an email that itself has an attached content item. Email service 150 can extract any content items available within such a container. In some embodiments, the attachment is embedded within the email as an "in-line" attachment.

Email service can also determine whether the email directly references a content item (306). A direct reference can include a URL for the content item or another unambiguous identification of a content item (e.g., a hash, unique identifier, etc. of the content item). If the email directly references a content item, email service 150 can determine if it has a URL that directs to content management system (308). For example, if content management system 110 is at "Dropbox.com" and the URL is "Dropbox.com/content/8743b52063cd84097a65d1633f5c74f5", email service 150 can determine that the URL directs to content management system by looking at the domain name. If the email has a URL for content management system 110, email service 150 can retrieve an identifier for the content item 310. For example, it can communicate with sharing service 128, access control list 145, server file journal 148, content directory 144, etc. to resolve a content item identifier from the URL.

If the URL is for another system that is external to content management system 308, then email service 150 can download the content item using the URL (314). For example, if content management system 110 is at "dropbox.com" and the URL is for "example.com/content/8743b52063cd84097a65d1633f5c74f5", then the content item is external to content management system 110. Email service 150 can log in to the external service, download the content item via the URL, and save the content item at content storage 142. In some embodiments, email service 150 can use an API to download the content item; otherwise email service 150 can parse the URL to determine how to download the content item. For example, email service 150 can use natural language processing service 154 to find a "download file" button or similar at the URL's web page.

Email service 150 can determine whether the email indirectly references a content item (312). In some embodiments, an email might reference a content item indirectly without using a link or other direct reference. For example, the text of an email might say "this year's sales status report indicates a drop in revenue." The system can use natural language processing service 154 to analyze the text of the email and then identify a content item that likely matches the indirect reference (e.g., "sales report 2016.pdf"); matching and tracking service 152 can then associate the matched content item with the email. For example, email service 150 can use natural language processing system 154 to determine that the email is referencing a content item (e.g., "report") and determine keywords that might be relevant (e.g., "this year", "sales", "status", "report") (316). Email service 150 can then find a content item or content items stored at content management system 110 that match the keywords (318). Content management system 110 can analyze content items using natural language processing service 154 or machine learning to determine appropriate keywords and tags; email service can match the email keywords with the content item keywords. In some embodiments, only content items that have been recently (e.g., within the past hour, day, week, etc.) are matched.

FIG. 4 shows an example method 400 for storing a content item and updating permissions of the stored content item. Example method 400 can implement some or all of the functionality for step 206 of FIG. 2—"process the content item". Email service 150 can communicate with content management service 116 to store the content item (402). For example, content management service 116 can store the content item in content storage 142.

Email service 150 can identify user accounts associated with participant email addresses (404). For example, email service 150 can have email addresses that are associated with user accounts in account database 140. In some embodiments, the email addresses at email service 150 are user account identifiers in account database 140. In some embodiments, user accounts in account database 140 are associated with email addresses (e.g., as a contact means), email service 150 can then identify which accounts are thus associated. In some embodiments, step 404 includes verifying the email address associated with the account to ensure that the account truly does "own" or control the email address.

A participant for an email can be a sender or recipient identified in an email message. A sender can be the user account that sent the email and/or a "reply to" user account. A recipient can be a direct (i.e., "to:" line), carbon copy (i.e., "cc:" line), or blind carbon copy (i.e., "bcc:" line) recipient. Participants can be determined by looking at header fields for the email. In some embodiments, the term participant can refer to the email address of the participant or an associated user account on account database 140.

Email service 150 can then communicate with content management system 110 to update permissions for the stored content item to include identified user accounts (406). For example, email service 150 can grant participants read-only access or full access to the content item.

FIG. 5 shows an example method 500 for storing a content item from an email, removing the attachment of the content item and inserting a link to the stored content item into the email. This can be useful to encourage users to not attach content items but to store them at content management system 110 and then share the content items with other participants of the email. This can help manage revisions of the content item. For example, instead of participants sending drafts of the content item back and forth through email, which can easily result in bifurcated revision history, each participant can work with the same copy of the content item—which is stored in content storage 142. Example method 500 can implement some or all of the functionality of step 206 of FIG. 2.

Email service 150 can store the content item from the email (502). For example, the content item can be an attachment to the email and email service 150 can store the content item in content storage 142.

Email service 150 can then remove the attachment of the content item (504). For example, if the email is stored in email database 166 and includes an attachment, email service 150 can instruct email generation and modification service 156 to remove the attachment from the email.

Email service 150 can then generate a link to the content item stored at content storage 142 (506). For example, email service 150 can communicate with sharing service 128 to get a link to the content item. In some embodiments, the link carries with it access permissions; alternatively, email service 150 can implement functionality of example method 400 to add permissions to the content item as well as generate a link to the content item.

Email service 150, through email generation and modification service 156, can then insert the link into the email (508). For example, email service 150 can insert a description of the content item and the link at the top of the email. In some embodiments, email service 150 can utilize natural language processing service 154 and machine learning to generate a short summary of the content item to include in the description.

In some embodiments, email service 150 can store attachments to an email using a content storage 142, but provide the attachments whenever the email is requested. This can utilize the storage optimizations of content storage 142 on the backend without changing the user experience. For example, email service 150 can store the attachment as a content item at content storage 142 and retrieve an identifier for the stored content item. Email generation and modification service 156 can then replace the attachment with the identifier. Whenever email service 150 serves the email (e.g., to another email service, to a desktop or web based email client, or any other system that processes or presents the email), it can retrieve the content item using the identifier and insert the content item as an attachment. In some embodiment, the inserted attachment could be the latest version of the attachment, or could include both the original version attached to the email, and the latest version, or could at least include a link to one or more additional versions.

FIG. 6 shows an example method 600 for associating content items, emails, and participants. For example, email service 150 can receive an email (602). Step 602 can utilize similar principles as step 202 in FIG. 2. Email system 150 can, using matching and tracking service 152, then determine if the email shares characteristics with other emails (604). For example, multiple emails can share a subject line (or portion of a subject line), a unique identifier, subject matter (as determined by natural language processing service 156), or participants. Matching and tracking service 152 can determine that the emails are associated and indicate that they are all part of a single conversation (606). Matching and tracking service 152 can record this association in associative database 168. A conversation can also be termed a thread or chain.

Matching and tracking service 152 can then determine if the email includes a content item (608). Step 608 can include functionality of example method 300; for example, matching and tracking service 152 can determine if the email has an attachment or references a content item. In some embodiments, matching and tracking service 152 can determine that, despite not being attached to the email or referenced by the email, that the email is still associated with the email. For example, the content item can have similar subject matter as the email. Matching and tracking service 152 can then associate the email with the content item (610). For example, matching and tracking service 152 can record the association in associative database 168.

Matching and tracking service 152 can then associate the participants of the email with the email (612). For example, matching and tracking service 152 can store or locate a node for each participant in associative database 168 and record an association between the participants for the email in associative database 168.

Figure 7:
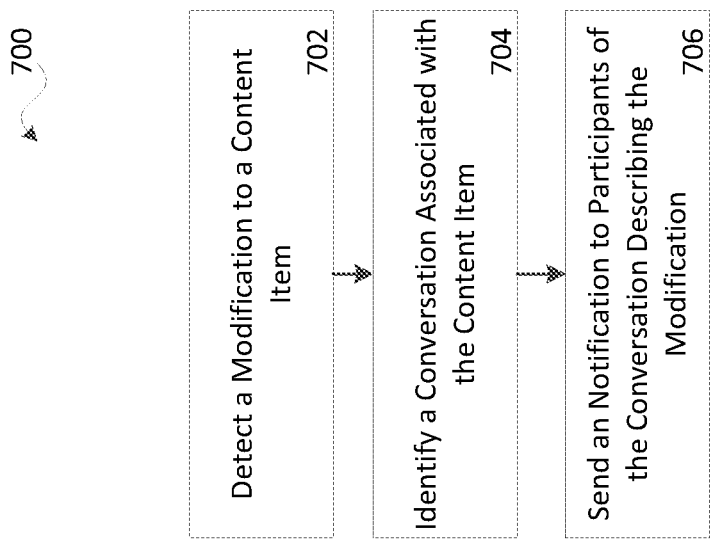
FIG. 7 shows an example method for detecting a modification to a content item, identifying a relevant email conversation, and sending a notification to participants of the conversation describing the modification.

FIG. 7 shows an example method 700 for detecting a modification to a content item, identifying a relevant email conversation, and sending a notification to participants of the conversation describing the modification. Content management system 110 can detect a modification to a content item (702), which can occur in several different ways. For example, content management system 110 can store the content item in associated with a user account, and as part of performing a synchronization operation with client device 170 associated with the user account, and content management service 116 can determine that the content item has been modified (e.g., a new version of the content item). Content management system 110 can also determine that the content item has been modified when it receives a modification of the content item via a web interface service 124. Content management system 110 can also determine that the content item has been modified when a subsequent email in an email thread containing the content item is determined to include a new version of the content item. More specifically, email service 150 can determine that it has received a new email in the email thread containing the original content item, and can compare two content items in association with one or more services of content management system 110 to detect a difference between the two content items.

In some embodiments, email service 150 or another component of content management system 110 can compare a hash value for at least a portion of a content item of an email with hash value for other content items or portions of content items already stored in content management system 110. This can help identify if a content item is already stored at content management system 110.

Matching and tracking service 152 can identify a conversation associated with the content item (704). For example, matching and tracking service 152 can identify an email or conversation that is associated with the content item in associative database 168.

Email service 150 can, using email generation and modification service 156, send a notification to participants of the conversation describing the modification (706). The notification can be an email which can be in the same conversation as previous emails associated with the content item (e.g., by having the same conversation id or subject line). Email service 150 can send this notification to some or all of the participants. A conversation might contain emails that do not include all participants of the conversation (e.g., the participants of other emails in the conversation), the participants of step 706 can be the participants of an email associated with the content item or, alternatively, all participants that have been included in the conversation, including those were added to emails in the email thread after the email to which the content item was attached (in other words, in some embodiments, email accounts that did not receive the original attachment can be updated with the current version of the attachment if those email account appear at any time in the email chain). Participants in step 706 can be the sender or recipients of a relevant email; for example, if a recipient modifies a saved copy of the content item, the original sender can be notified.

In some embodiments, the notification of example method 700 is a push notification. For example, the system can send a push notification to portable electronic devices 170 of the participants. The notification can include a summary of the changes to the content item.

The notification can include a natural language summary of changes as determined by natural language processing service 154. For example, natural language processing service 154 can detect changes and characterize the changes such as: "the introduction was corrected for grammatical reasons," "major modifications to content and substance were applied," or "the content item was corrected to have a consistently formal tone."

An example implementation of example method 700 is as follows. In some embodiments, email service 150 can detect a content item associated with an email (e.g., an attachment to the email or a reference in the email to a content item), compare the detected content item with a previous content item from the conversation, and detect a modification. For example, a first email can have an attachment "project.txt" and a second email might have an attachment similarly named "project.txt" (the file names do not need to match in order to be recognized as a new version of the attachment). Email service 150 can determine that the second attachment includes modifications to the first attachment (i.e., the second attachment is a new version of the first attachment). Email service 150 can then send an email to the participants identifying the modifications. For example, the email service 150 can send an email to just the sender (e.g., "you sent a modified version of the attachment, did this satisfy a task?") or just to the recipients (e.g., "the recently sent attachment was modified from its original form, here are changes . . . "). Email service 150 can send an email to participants encouraging them to use content management system 106 to access the content item including a link to the content item as stored on content management system 110.

Figure 8:
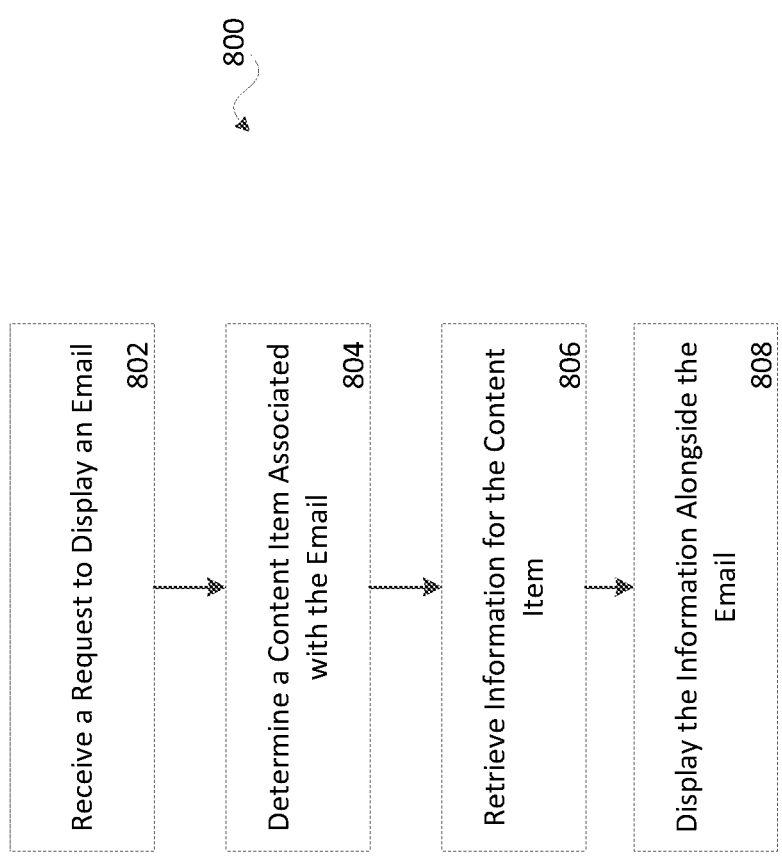
FIG. 8 shows an example method for displaying content item information alongside an associated email.

FIG. 8 shows an example method for displaying content item information alongside an associated email. For example, a user viewing or drafting an email might wish to see associated content items, the status of those content items, or other metadata associated with those content items alongside the email. Email composition service 160 can receive a request to display an email (802). For example, email editor 162 can send such a request. Matching and tracking service 152 can then reference associative database 168 to find a content item (or content items) associated with the email (804). In some embodiments, the content item is not directly associated with the email in associative database 168, but is associated by way of another email, conversation, participant, etc.

Email service 150 can then retrieve information for the content item from content management system 110 (806). For example, email service 150 can retrieve the content item itself from content storage 142, metadata for the content item from metadata database 146, users that can access the content item from access control list 145, etc. In some embodiments, the information includes presence and seen state of users for the content item; for example, the information can indicate which users have viewed or are viewing the content item.

The retrieved information can include a status for the stored content item. For example, the status can indicate user account(s) that have previously or are currently accessing or viewing the stored content item. The status for the stored content item can indicate that the content item is locked. In some embodiments, email read receipts can inform a content item's status. For example, when email service 150 receives a read receipt for an email, it can update the status for the content item to indicate that a user or user account of the email has viewed the content item.

The retrieved information can include messages associated with the content item. For example, email service 150 can communicate with matching and tracking service 152 to determine other emails (including emails outside of the current email thread) that might be associated with the content item. Email service 150 can communicate with collaboration service 126 to identify comments on the content item, instant messages referencing the content item, etc.

The retrieved information can include tasks related to the content item. For example, collaboration service 126 can include task management and can assign a user account to perform a particular task on the content item. In some embodiments, the task is part of a multi-user collaboration system managed by collaboration service 126.

The retrieved information can include a thumbnail, preview, or other representation of the stored content item. In some embodiments, natural language processing service 154 can summarize the content item.

In some embodiments, the information includes executable code to generate a web-view of the stored content item. For example, the information can be an html iframe that has view and edit capabilities.

Content item display service 164 can then display the information alongside the email (808). In some embodiments, this includes natural language processing service 154 analyzing the email and suggesting, via matching and tracking service 152, content items that the user might want to attach or reference within the email. In some embodiments, email composition service 160 can display the status of other participants of the email conversation relative to the content item along with the content item. Content item display service 164 can display the information as an overlay to the email. In some embodiments, email composition service 160 can present an email in one area of a display and display content items associated with the email in a second area of the display.

Figure 9A:
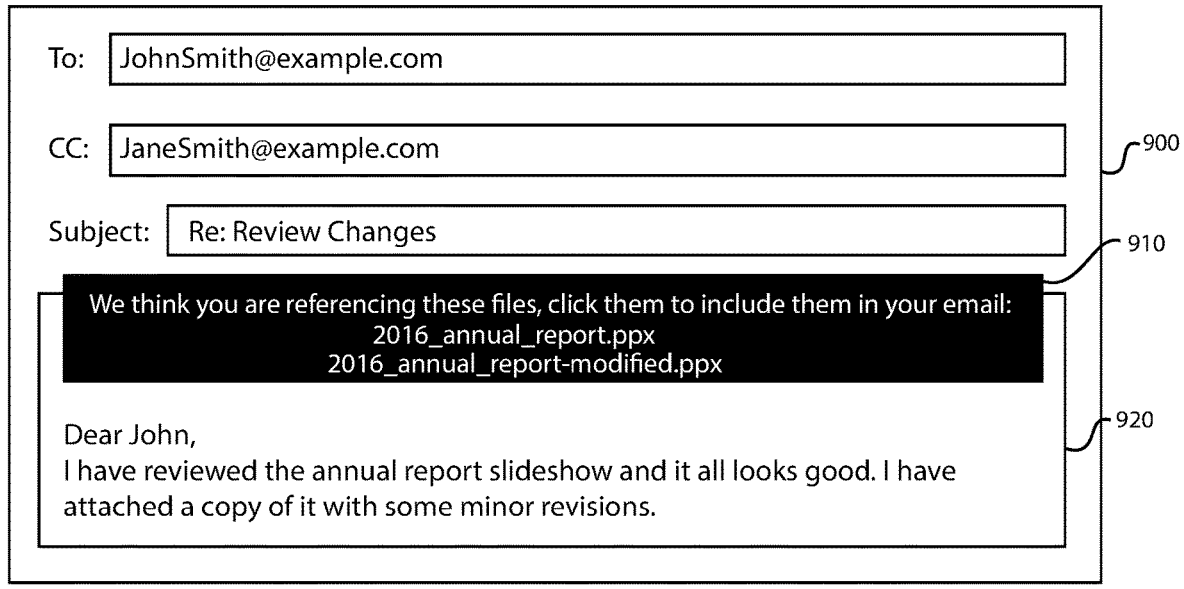
FIGS. 9A, 9B, 9C, 9D show example user interfaces according to various embodiments.

FIGS. 9A-9D show example user interfaces according to various embodiments. Email editor 162 and content item display service 164 can display these example user interfaces. In FIG. 9A, an email interface 900 shows an email composition area 920 and an alert 910. The alert 910 can inform a user that they are referencing a content item and can suggest content items that the user might be referencing in composition area 920. For example, the email service 150 can determine that the user has forgotten to attach a content item by detecting language such as "see the above attachment" or "I have attached . . ." and determining that no such attachment exists. The system can detect a reference to a content item using natural language processing 154. For example email service 150 can determine that "I have reviewed the annual report" or similar can reference a content item even without intent to include the content item. In some embodiments, email service 150 can determine that an email is related to the content item even without directly referencing the content item by referencing associative database 168. Content item display service 164 can then present possible matching content items that are related to the email. A user can then select to include a suggested content item. Email service 150 can then include the content item as demonstrated in FIGS. 9B-9D.

Figure 9B:
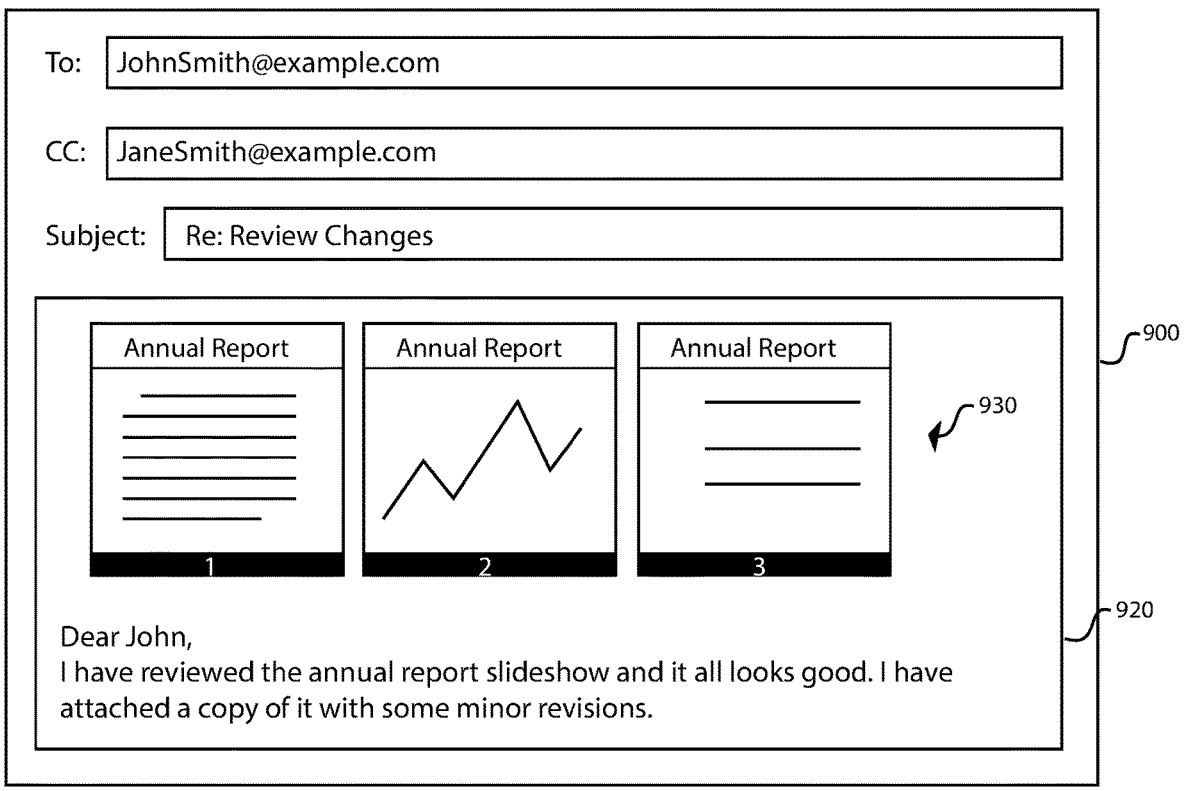

As shown in FIG. 9B, email service 150 via email composition service 160 can insert previews 930 of the content item into the email. In some embodiments, content management system 110 creates the preview of the content item and sends it to email service 150 for inclusion in the email. In some embodiments, email service 150 determines the most appropriate preview 930 based on the reference to the content item. For example, email service 150 can determine that the email references a particular portion or page of the content item and the preview can include that portion. In some embodiments, the content item is displayed within the email as a preview. In some embodiments, the preview 930 is a live preview that will dynamically update according to any changes to the content item (e.g., on content management system 110). In some embodiments, the dynamic preview allows a user to edit the content item via the preview 930; such edits can be propagated through content management system 110. Web interface service 124 can present this live preview.

Figure 9C:
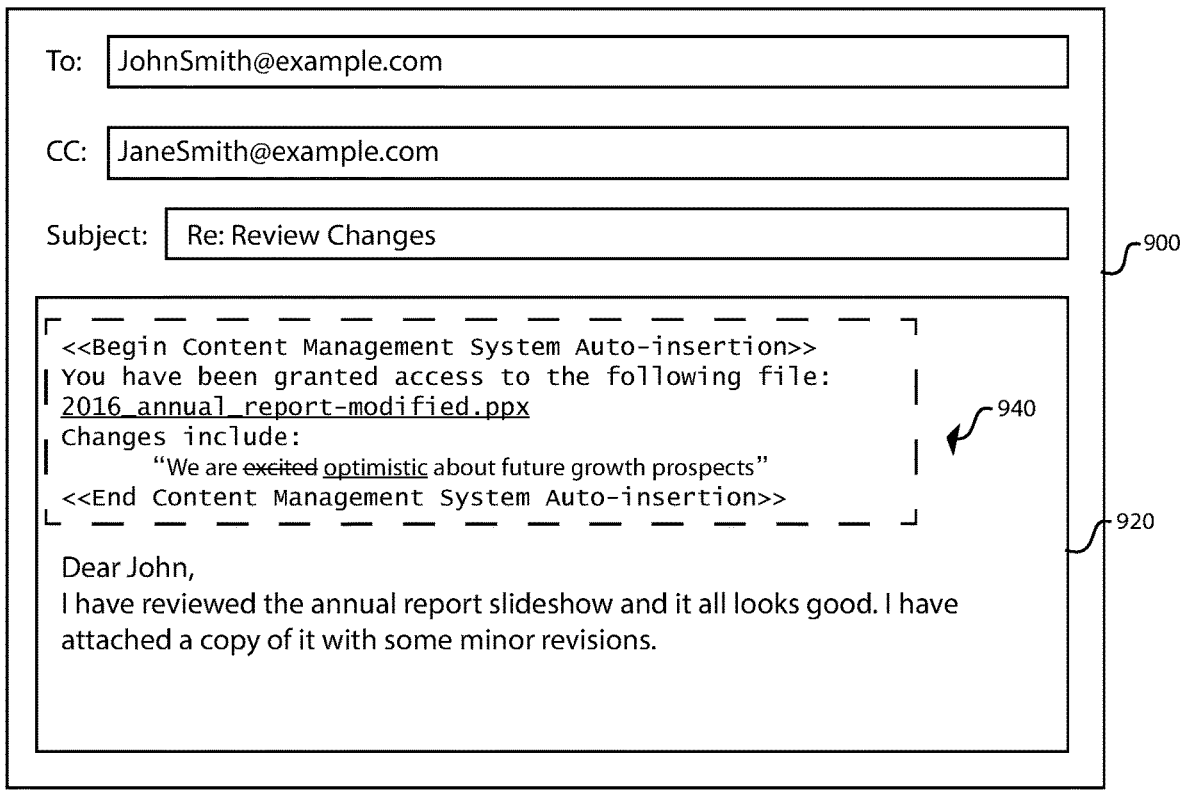

As shown in FIG. 9C, email service 150 can generate a reference 940 to the content item on content management system 110. For example, email service 150 can request that sharing service 128 generate a share link for the content item and insert the share link within the email. In some embodiments, the reference 940 can include a summary or indication of a change made to the content item. In some embodiments, the reference can include a description of a task related to the content item.

Figure 9D:
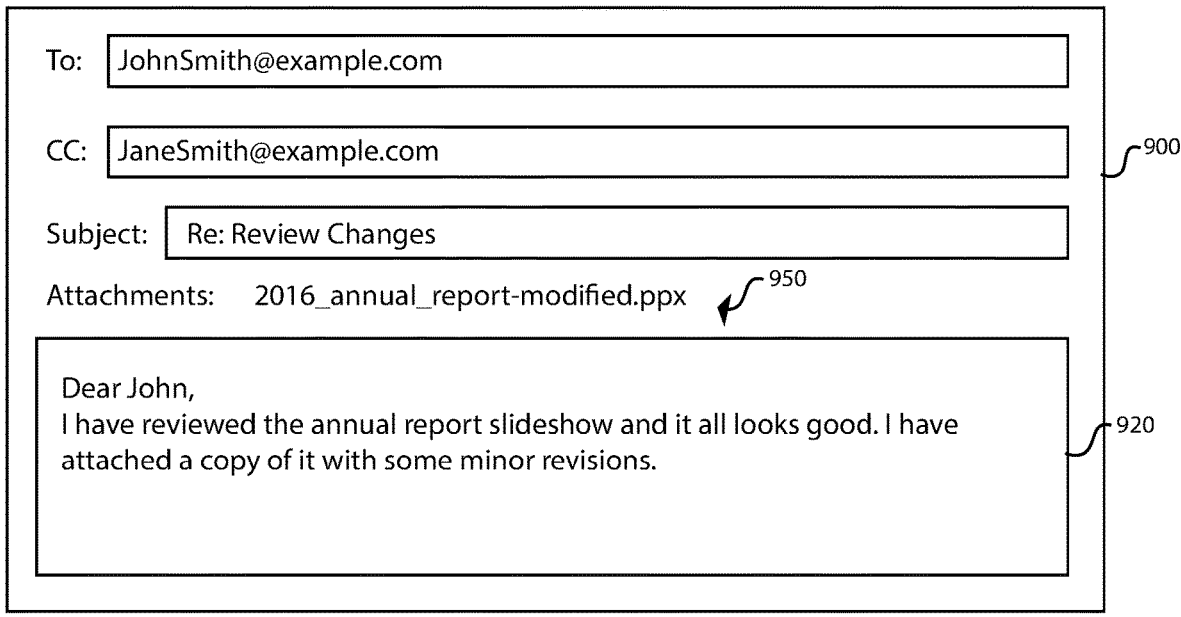

As shown in FIG. 9D, email service 150 can include the content item as an attachment 950 to the email.

Figure 10:
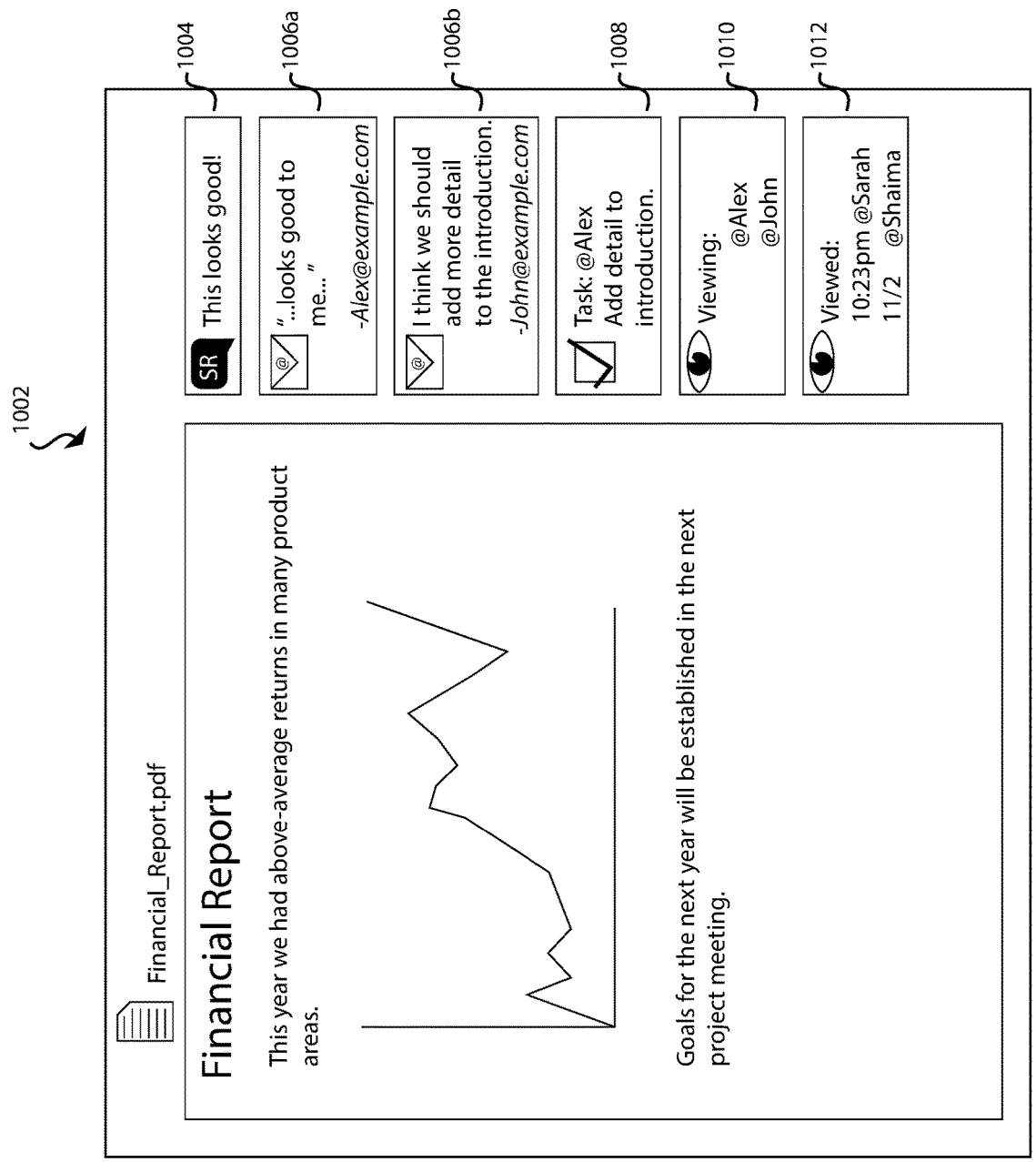
FIG. 10 shows an example user interface with information from emails displayed alongside a content item.

FIG. 10 shows an example user interface with information from emails displayed alongside a content item. For example, content management system 110 can retrieve emails or messages from email service 150 and present that information with a content item. Content management system 110 can identify emails that are associated with the content item. It can do this by determining that an email references the content item, has the content item as an attachment, or is associated by any other technique herein disclosed. Content management system 110 can then present the email (e.g., emails 1006a and 1006b) alongside content item 1002. In some embodiments, content management system 110 can determine a relevant portion of the email for presentation (e.g., email 1006a). In some embodiments, content management system 110 can present comments 1004 and/or tasks associated with the content item 1008 alongside content item 1002. In some embodiments, content management system 110 can analyze the contents of an email and determine that it includes a task (e.g., email 1006b); content management system 110 can then automatically create a task for the content item (e.g., task 1008). In some embodiments, the sender of the message can designate a recipient of the message to be responsible for replying to the message or carrying out other task, and this can be displayed in similar fashion to task 1008). In some embodiments, the user interface can show which users have seen an email (e.g., using read receipts).

In some embodiments, content management system 110 can identify users currently viewing the content item (1010). Similarly, content management system 110 can identify users that have viewed the content item and when they viewed the content item (1012).

In some embodiments, content management system 110 can provide a selectable option whereby a user can email users associated with the content item (e.g., participants of a conversation that references the content item).

In some embodiments, a content management service search can surface emails alongside content items, even if those emails are stored solely on email service. An aggregation system can combine results from content management system 110 and the email service.

It should be understood that the principles herein disclosed are equally applicable to email services, instant messaging systems, message boards, collaboration platforms, etc. While the present technology has been described with reference to email, any messaging platform can make use of the present technology. In some embodiments, the present technology incorporates a plurality of different communication mediums into the same communication thread. In such embodiments, a message thread can include emails, notifications of updated documents, text messages, instant messages, recorded video conversations or meetings, all in the same thread.

While much of this disclosure has addressed the benefits of the present technology from the point of view of the messaging client, in some embodiments the advantages and features of the present technology are also applicable through a directory view. As addressed above, content management system 110 can provide an interface for viewing content items. In some embodiments, content management system 110 can provide information in a directory view showing which email conversations reference the content item.

Figure 11:
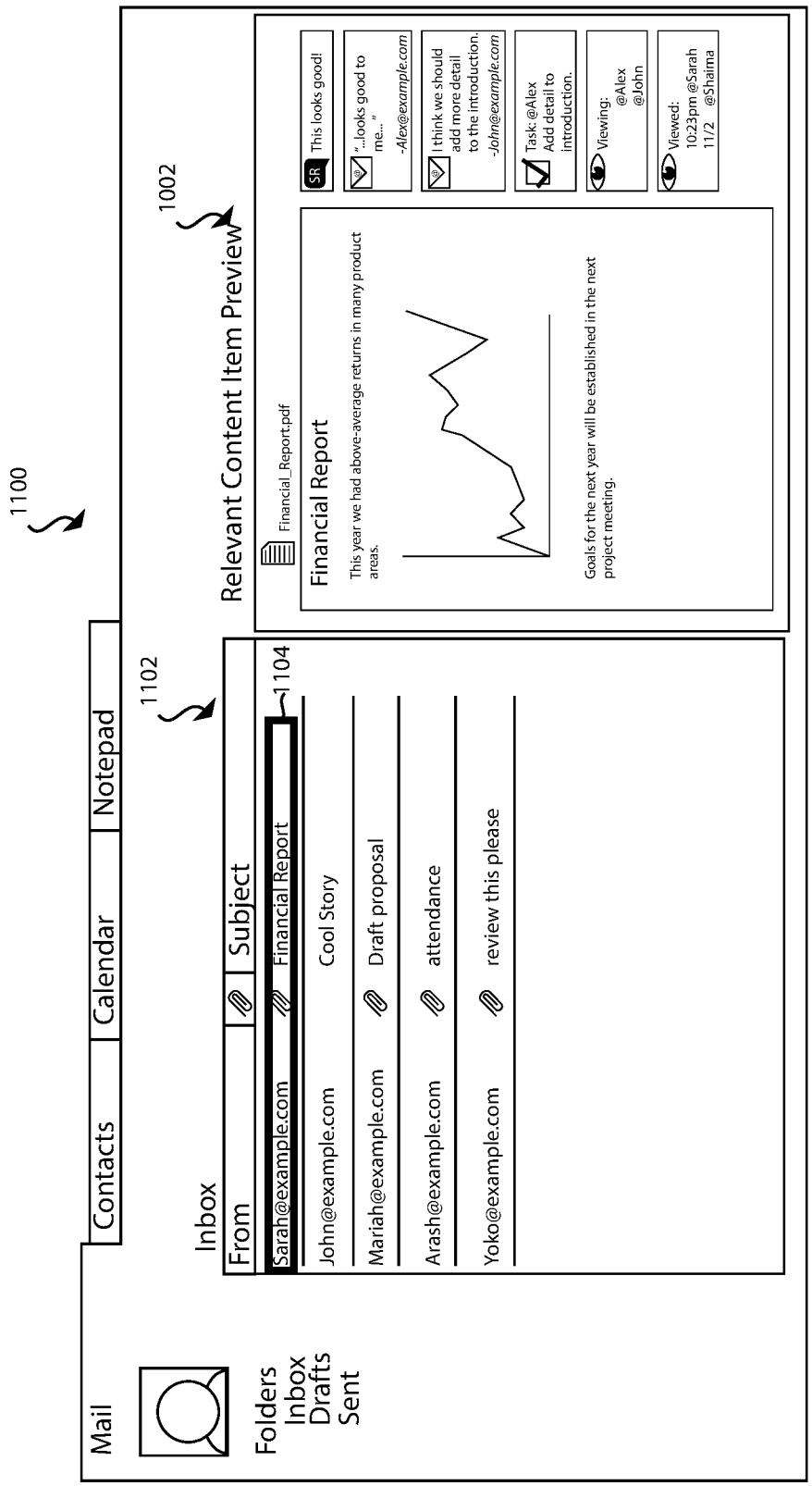
FIG. 11 shows an example email interface for displaying content item information alongside an email.

FIG. 11 shows an example email interface 110. For example, email composition service 160 and web interface service 124 can present example email interface 110. Example email interface 110 can include a list of email messages and/or conversations 1102. Email composition service 160 can receive a selection of an email or conversation 1104. Email composition service 160 can then display content item preview 1002 similar to that in FIG. 10 associated with the selected email. For example, matching and tracking service 152 can identify an associated content item relative to the selected email or conversation and content item display service 164 can display relevant information.

In some embodiments, the information displayed in the sidebar illustrated in FIG. 11 can be provided in a conventional email client through integration of collaboration client interface, addressed above, in conjunction with conventional email client. Conventional email client can also include a plugin to provide the benefits of the present technology.

Figure 12:
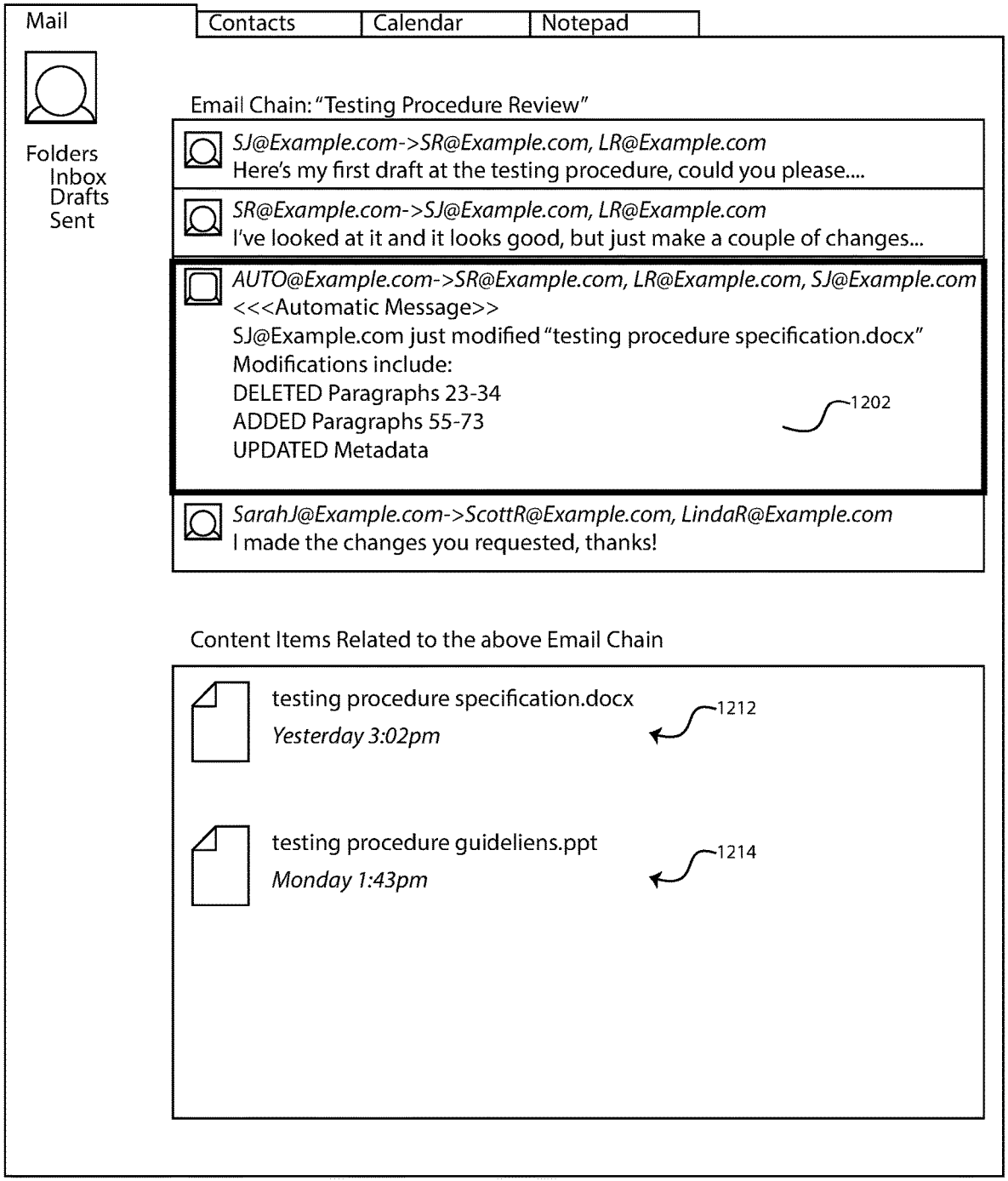
FIG. 12 shows an example email interface for displaying a change notification and an email chain.

FIG. 12 shows another example user interface of email composition service 160. As addressed above, email service 150 in combination with content management service 110 can notify addressees of an email or email chain whenever a content item attached to an email in the email chain is updated. FIG. 12 shows update notification 1202 showing that a content item "testing procedure specification.docx" that is referenced in the email chain has been updated by user "SJ@Example.com". In this view, notification 1202 is clearly differentiated from other messages in the conversation. Notification 1202 is differentiated because it was automatically sent by email generation service 156, and not by any email account addressed in this conversation.

FIG. 12 also illustrates, content items 1212, 1214, which are attached to messages in the email conversation. In some embodiments, all content items attached to or otherwise associated with an email conversation can be listed in the side bar.

In some embodiments, the view shown in FIG. 12 is only available using a specialized client capable of supporting the functionalities described herein. However, many of the functionalities can be provided in conventional email clients but through different views. For example, notification 1202 may not be differentiated in a conventional email client; instead notification 1202 may look like a normal email in the conversation. In some embodiments, notification 1202 may note that it was automatically generated by email generation service 156.

Figure 13:
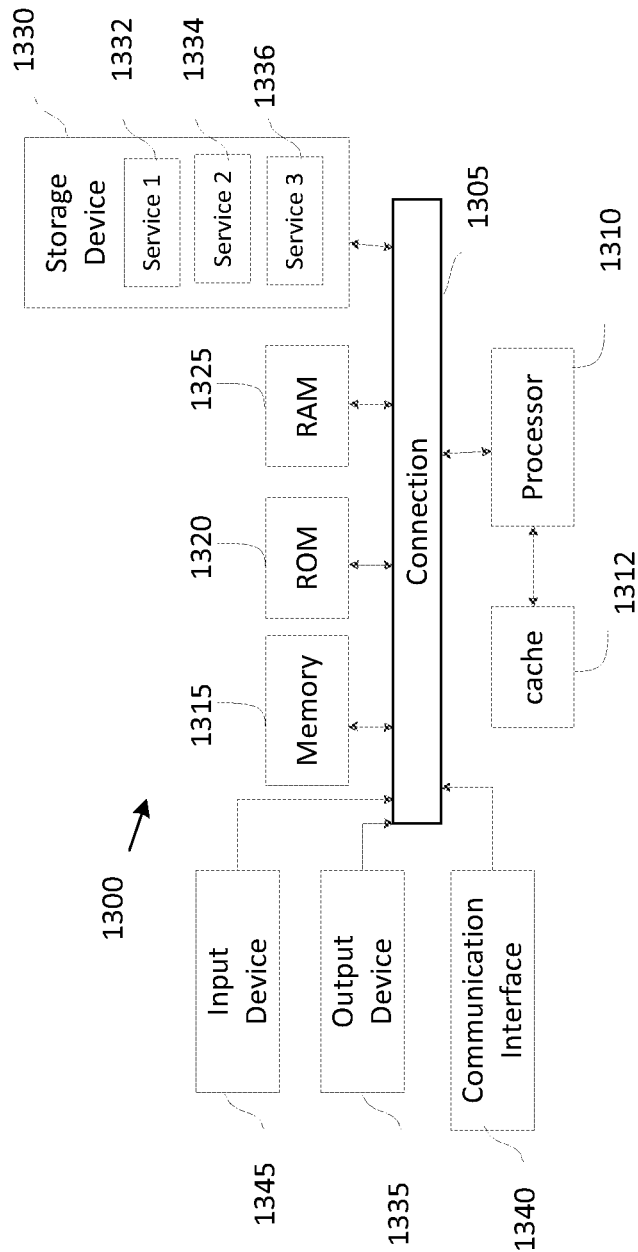
FIG. 13 shows an example of a system for implementing certain aspects of the present technology.

FIG. 13 shows an example of computing system 1300 in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments computing system 1300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read only memory (ROM) and random access memory (RAM) to processor 1310. Computing system 1300 can include a cache of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, at a content management system, an electronic correspondence associated with at least one messaging account;
determining that the at least one messaging account is associated with at least one user account of the content management system, the content management system synchronizing a plurality of content items shared between a plurality of user devices and a plurality of respective user accounts;
automatically updating permissions to a content item to include one or more user accounts associated with respective email addresses of participants of the electronic correspondence sharing the content item;
determining that a first content item attached to the electronic correspondence is a version of a second content item within the at least one user account of the content management system;
in response to determining that the first content item is the version of the second content item, associating the electronic correspondence with the second content item at the content management system and updating permissions associated with the first content item, the second content item, and the at least one messaging account based on the first content item being a version of the second content item;
determining that a modification of the second content item has been synchronized to the content management system; and
providing a notification of the modification of the second content item to participant user accounts identified within the electronic correspondence.

2. The computer-implemented method of claim 1, further comprising:
generating an alert based on detected natural language in the electronic correspondence that mentions the first content item, wherein the alert can be selected to generate a reference to the second content item.

3. The computer-implemented method of claim 2, further comprising:
generating the reference to the second content item and including a relevant change associated with the second content item in a body of the electronic correspondence.

4. The computer-implemented method of claim 1, further comprising:
generating an email interface that includes a preview of the first content item or the second content item along with related comments and tasks associated with the first content item or the second content item.

5. The computer-implemented method of claim 4, wherein the email interface further includes a real-time indication of which user accounts are viewing or have viewed the first content item or the second content item.

6. The computer-implemented method of claim 1, further comprising:
generating a list of related content items including the first content item and the second content item for a chain of electronic correspondences including the electronic correspondence.

7. The computer-implemented method of claim 1, further comprising:
associating the electronic correspondence with the at least one user account and the first content item in an associative database that contains a database of associations between nodes representing content items, emails, email accounts, and user accounts that have relationships with each other at least partially based on emails tracked by the content management system and an access control list of the content management system regarding access to content items, wherein one or more associations are derived from other associations of the associative database.

8. A system comprising:
a storage configured to store instructions; and
a processor configured to execute the instructions and cause the processor to:
receive, at a content management system, an electronic correspondence associated with at least one messaging account;
determine that the at least one messaging account is associated with at least one user account of the content management system, the content management system synchronizing a plurality of content items shared between a plurality of user devices and a plurality of respective user accounts;
automatically update permissions to a content item to include one or more user accounts associated with respective email addresses of participants of the electronic correspondence sharing the content item;
determine that a first content item attached to the electronic correspondence is a version of a second content item within the at least one user account of the content management system;
in response to determining that the first content item is the version of the second content item, associate the electronic correspondence with the second content item at the content management system and updating permissions associated with the first content item, the second content item, and the at least one messaging account-based on the first content item being a version of the second content item;
determine that a modification of the second content item has been synchronized to the content management system; and
provide a notification of the modification of the second content item to participant user accounts identified within the electronic correspondence.

9. The system of claim 8, wherein the processor is configured to execute the instructions and cause the processor to:
generate an alert based on detected natural language in the electronic correspondence that mentions the first content item, wherein the alert can be selected to generate a reference to the second content item.

10. The system of claim 9, wherein the processor is configured to execute the instructions and cause the processor to:
generate the reference to the second content item and including a relevant change associated with the second content item in a body of the electronic correspondence.

11. The system of claim 8, wherein the processor is configured to execute the instructions and cause the processor to:
generate an email interface that includes a preview of the first content item or the second content item along with related comments and tasks associated with the first content item or the second content item.

12. The system of claim 11, wherein the email interface further includes a real-time indication of which user accounts are viewing or have viewed the first content item or the second content item.

13. The system of claim 8, wherein the processor is configured to execute the instructions and cause the processor to:
generate a list of related content items including the first content item and the second content item for a chain of electronic correspondences including the electronic correspondence.

14. The system of claim 8, wherein the processor is configured to execute the instructions and cause the processor to:
associate the electronic correspondence with the at least one user account and the first content item in an associative database that contains a database of associations between nodes representing content items, emails, email accounts, and user accounts that have relationships with each other at least partially based on emails tracked by the content management system and an access control list of the content management system regarding access to content items, wherein one or more associations are derived from other associations of the associative database.

15. A non-transitory computer-readable medium comprising instructions, the instructions, when executed by a computing system, cause the computing system to:

receive, at a content management system, an electronic correspondence associated with at least one messaging account;

determine that the at least one messaging account is associated with at least one user account of the content management system, the content management system synchronizing a plurality of content items shared between a plurality of user devices and a plurality of respective user accounts;

automatically update permissions to a content item to include one or more user accounts associated with respective email addresses of participants of the electronic correspondence sharing the content item;

determine that a first content item attached to the electronic correspondence is a version of a second content item within the at least one user account of the content management system;

in response to determining that the first content item is the version of the second content item, associate the electronic correspondence with the second content item at the content management system and updating permissions associated with the first content item, the second content item, and the at least one messaging account based on the first content item being a version of the second content item;

determining that a modification of the second content item has been synchronized to the content management system; and provide a notification of the modification of the second content item to participant user accounts identified within the electronic correspondence.

16. The non-transitory computer-readable medium of claim 15, wherein the non-transitory computer-readable medium further comprises instructions that, when executed by the computing system, cause the computing system to:

generate an alert based on detected natural language in the electronic correspondence that mentions the first content item, wherein the alert can be selected to generate a reference to the second content item.

17. The non-transitory computer-readable medium of claim 16, wherein the non-transitory computer-readable medium further comprises instructions that, when executed by the computing system, cause the computing system to:

generate the reference to the second content item and include a relevant change associated with the second content item in a body of the electronic correspondence.

* * * * *